United States Patent
Dekoninck et al.

(10) Patent No.: US 10,119,775 B2
(45) Date of Patent: Nov. 6, 2018

(54) HIGH-PERFORMANCE HEAT-INSULATING MATERIALS

(75) Inventors: Alexandra Dekoninck, Eaubonne (FR); Nikolai Denkov Denkov, Sofia (BG); Ivan Igorov Lesov, Sofia (BG); Slavka Stoyanova Tcholakova, Sofia (BG); Konstantin Nikolaev Golemanov, Rotterdam Pays-Bas (NL)

(73) Assignee: SAINT-GOBAIN ISOVER, Courbevoie (FR)

( * ) Notice: Subject to any disclaimer, the term of this patent is extended or adjusted under 35 U.S.C. 154(b) by 219 days.

(21) Appl. No.: 14/232,440

(22) PCT Filed: Jul. 12, 2012

(86) PCT No.: PCT/FR2012/051666
§ 371 (c)(1),
(2), (4) Date: Feb. 7, 2014

(87) PCT Pub. No.: WO2013/007958
PCT Pub. Date: Jan. 17, 2013

(65) Prior Publication Data
US 2014/0166248 A1    Jun. 19, 2014

(30) Foreign Application Priority Data
Jul. 13, 2011   (FR) ...................................... 11 56429

(51) Int. Cl.
| | | |
|---|---|---|
| C04B 38/00 | (2006.01) | |
| F28F 21/06 | (2006.01) | |
| C08J 9/00 | (2006.01) | |
| C08J 9/30 | (2006.01) | |
| B29C 44/02 | (2006.01) | |
| C04B 111/28 | (2006.01) | |

(52) U.S. Cl.
CPC .............. *F28F 21/06* (2013.01); *B29C 44/02* (2013.01); *C04B 38/0064* (2013.01); *C08J 9/0066* (2013.01); *C08J 9/30* (2013.01); *C04B 2111/28* (2013.01); *C04B 2201/20* (2013.01); *C08J 2205/042* (2013.01); *C08J 2205/044* (2013.01); *C08J 2205/048* (2013.01); *Y02W 30/94* (2015.05)

(58) Field of Classification Search
CPC ............................................. C08J 2205/0048
See application file for complete search history.

(56) References Cited

U.S. PATENT DOCUMENTS

| 4,726,870 | A | * | 2/1988 | McWilliams | ........... C04B 30/00 156/146 |
| 5,549,990 | A | * | 8/1996 | Clough | .................... H01M 4/14 429/204 |
| 5,641,815 | A | * | 6/1997 | Fehlmann | ............... C04B 28/02 106/122 |
| 5,786,294 | A | * | 7/1998 | Sachtler | ................. B01J 37/033 502/217 |
| 2004/0077738 | A1 | | 4/2004 | Field et al. | |
| 2005/0047985 | A1 | * | 3/2005 | Mori | ................... C01B 33/1585 423/335 |
| 2012/0097907 | A1 | | 4/2012 | Bauer et al. | |
| 2012/0142802 | A1 | * | 6/2012 | Steinke | ................. C08G 12/32 521/187 |

FOREIGN PATENT DOCUMENTS

| EP | 1 892 226 | 2/2008 | |
| WO | 03 097227 | 11/2003 | |
| WO | WO-2005023918 A1 * | 3/2005 | ............ C08J 9/0066 |
| WO | 2006 134080 | 12/2006 | |
| WO | WO 2007129849 A1 * | 11/2007 | ........... C01B 33/143 |
| WO | 2010 126792 | 11/2010 | |
| WO | 2011 015751 | 2/2011 | |
| WO | 2011 095745 | 8/2011 | |

OTHER PUBLICATIONS

Dotmar, "Density of Plastics", 2009, p. 1-2; Accessed on Nov. 4, 2015 at http://web.archive.org/web/20091003195247/http://www.dotmar.com.au/index2.php?page=shop.browse&option=com_virtuemart&category_id=108&pop=1&print=true.*
English language translation of WO 2005/023918A1, generated with Espacenet on Jun. 15, 2018.*
International Search Report dated Oct. 5, 2012 in PCT/FR12/051666 Filed Jul. 12, 2012.

* cited by examiner

*Primary Examiner* — Mark Ruthkosky
*Assistant Examiner* — Julia L Rummel
(74) *Attorney, Agent, or Firm* — Oblon, McClelland, Maier & Neustadt, L.L.P.

(57) ABSTRACT

The present invention relates to a heat-insulating material, in particular in the form of a solid foam, based on silica particles of submicron porosity, this material incorporating two different ranges of porosities, advantageously including a first range consisting of (macro)pores with diameters of between 10 microns and 3 mm, and a second range consisting of submicron pores with diameters greater than 4 nm and less than 300 nm, the pore volume of said submicron pores being at least 1 cm$^3$/g and the mass per unit volume of said insulating material being less than 300 kg/m$^3$, and also relates to the process for obtaining the same.

12 Claims, No Drawings

HIGH-PERFORMANCE HEAT-INSULATING MATERIALS

The present invention relates to a high-performance heat-insulating material, to the process for manufacturing it, and to its use in the construction field for insulating the walls (exterior or interior) of buildings or for filling interstices in materials (hollow walls or "cavity walls", pipes, etc.), this insulating material possibly being in the form of panels, or optionally in the form of granules, blocks, layers, projections, moldings, etc.

Whether it concerns the new construction or the renovation market, the demand for efficient insulating products, in particular heat-insulating products, is still just as great. Besides increased insulating properties and compliance with the specifications of building works, the demand for products that offer greater comfort of use, longevity, savings in raw materials, etc. with a view especially to sustainable development, is also increasing. It is particularly advantageous, in this search for materials offering better heat insulation, that said materials should also have, or even improve upon, other desired properties in the construction of buildings, especially as regards load lightening, mechanical strength, sound insulation, etc.

A wide variety of heat insulators is currently known. Among the most common products, mention may be made of fibrous insulators, based on natural or synthetic fibers such as glass wool or rock wool, cellular insulators of the expanded polymer type such as expanded or extruded polystyrene, or phenolic or polyurethane foams. The thermal performance qualities of essentially mineral insulating materials are reflected by heat conductivity values $\lambda$ commonly greater than 35, in particular of the order of 40 mW/m·K, which values may be lower in the case of essentially organic insulators, for example in the case of cellular insulators incorporating a gas with a lower heat conductivity than air, to improve the thermal performance qualities. One drawback of these materials is, however, the difficulty in keeping the gas within the matrix over time, since on aging the material loses some of these thermal performance qualities. What is more, for organic insulators, the fire reaction is poor on account of their nature.

Use may also be made of materials in which a vacuum has been created so as to form, for example, panels under vacuum. These insulators are difficult to use since they can neither be cut nor pierced, and they may undergo a gradual loss of vacuum over long periods.

Insulators that may also be mentioned are aerogels, generally in the form of translucent granules or powder with grain or granule sizes conventionally of the order of a millimeter, these aerogels being particularly efficient in terms of heat insulation, but their poor mechanical properties require them to be used with protections or a reinforcing agent, or aerogels within mats (or plies) formed from (mechanically strong) entangled fibers for which it may be difficult to give a determined shape. These aerogels (in particular of silica) are difficult and expensive to obtain at the industrial scale, they require intricate drying conditions and their combination with other insulators to obtain mechanical strength or an adequate form may be complex. Their use thus remains limited.

There is consequently a strong need to develop materials that are efficient in terms of heat insulation, but that are also easier and less expensive to manufacture industrially than aerogels in particular. Besides its good heat performance qualities (improved relative to the current mineral products), it is desirable for the product to have good resistance (especially to aging, or in terms of mechanical strength or the like: chemical resistance, fire resistance, etc.) without emburdening its charge. It is also desirable for it to remain easy to spread during its hardening and for it to enable the preparation of any desirable form, especially by molding (or optionally by spreading or spraying of a layer).

The present invention has thus developed novel insulating materials for achieving the same and for overcoming the drawbacks mentioned previously, these novel materials being essentially mineral, being obtained directly (without needing to make use of a chemical reaction that modifies their chemical composition) from mineral particles of (or having) submicron porosity (i.e. comprising pores with diameters of less than 1 μm) and having two different ranges of porosities. Among these materials, the present invention focused in particular on those obtained from silica particles, having the advantage of high porosity (higher than those, for example, of other mineral particles such as carbonate or silicate particles), these materials being, however, more difficult to obtain (than when the carbonate or silicate particles mentioned previously are used, for example) due especially to the small size of silica (generally less than a few hundred nanometers), their generally more hydrophilic nature, and the difficulty in stabilizing silica particles and the porous material (foam) obtained. The present invention in particular sought a production process more specifically suited to the case of said materials based on silica particles to enable further improved thermal properties to be obtained, and also to afford the materials obtained better stability.

The present invention satisfies the preceding objectives by proposing a novel heat-insulating material, in particular (at least) in the form of a solid foam, this material being formed from (or made from, or based on) silica particles of submicron porosity, this material integrating (or comprising or combining) two different (or distinct or disjoint) ranges of porosity, advantageously including a first range (referred to as macroporosity in the present invention), consisting of pores (referred to as macropores) with diameters (i.e. having a diameter distribution) of between 10 microns et 3 mm, in particular between a few tens and a few hundred microns (and especially between 10 and 500 μm), and a second range (referred to as submicron porosity in the present invention) consisting of pores (referred to as submicron pores) with diameters (i.e. having a diameter distribution) of greater than 4 nm, preferably greater than 5 nm, and less than 300 nm and in particular less than 200 nm (or even less than 100 nm), the pore volume of said submicron pores being at least 1 cm$^3$/g (i.e. 1 cm$^3$ per gram of material) and the mass per unit volume (apparent or global, i.e. measured on the entire product) of the insulating material being less than 300 kg/m$^3$.

This material may be obtained from the process comprising the following steps:
- at least one step of preparing a mixture (or assembly), generally aqueous (dispersion, in particular suspension in water), of silica particles with a specific surface area S of greater than 5 m$^2$/g and in particular greater than 50 m$^2$/g, and having a pore volume of at least 1 cm$^3$/g in the porosity range of between 4 nm and 300 nm;
- at least one step of preparing a foam (aqueous (or wet)) including said particles (from the abovementioned mixture of particles and/or by incorporating said mixture of particles into an aqueous foam formed separately);

at least one step of putting in form (generally to form a monolith and/or a layer), especially by molding or casting or spraying (onto a surface or wall) of this foam;

at least one step of at least partial drying (by leaving to dry or by drying) the foam or the material thus obtained.

The preparation of the foam comprising the particles/mixture of particles may be performed:

by direct foaming: i.e. by introducing a gas into the mixture of particles via various methods such as: mechanical stirring, sparging with a gas, for example through a sinter (porous plate through which the gas is passed in order to generate the foam), in-situ bubbling of a dissolved gas (for example pentane) or of a gas by chemical reaction, especially by decomposition (for example of hydrogen peroxide into water and dioxygen), etc., and/or by incorporation: i.e. the incorporation of the mixture of particles into an already-preformed aqueous foam (or, conversely, the incorporation of the preformed foam into the mixture of particles), said foam being prepared, for example, by foaming using a dispersion (generally aqueous) into which is introduced a gas via one of the above methods, the actual foaming generally taking place in the presence of at least one surfactant (adding to the mixture of particles in the case of direct foaming, or the surfactant being present in the dispersion that is foamed to form the aqueous foam in the case of incorporation).

Even if the use of a surfactant (or surface agent) of anionic type (or salt of anionic surfactant) is possible, the present invention has demonstrated, to obtain the materials according to the invention, the advantage of using as surfactant(s) one or more zwitterions of pentane type, and advantageously cocamidopropylbetaine (or CAPB, based on lauramidopropylbetaine or {[3-(dodecanoylamino)propyl](dimethyl)ammonio}acetate) and has in parallel developed an advantageous and particularly efficient specific process for obtaining further improved insulating materials starting with silica (particles), this process comprising the following steps:

at least one step of preparing a mixture (or assembly), generally aqueous (dispersion, in particular suspension in water), of silica particles with a specific surface area S of greater than 5 $m^2/g$ and in particular greater than 50 $m^2/g$, and having a pore volume of at least 1 $cm^3/g$ in the porosity range of between 4 nm and 300 nm;

at least one step of preparing a foam from said mixture of particles by incorporating (as surfactant(s)) at least one zwitterion chosen from betaines, in particular ammonium betaines and more particularly preferably cocamidopropylbetaine;

at least one step of putting in form (generally to form a monolith and/or a layer), especially by molding or casting or spraying (onto a surface or wall) of this foam;

at least one step of at least partial drying (by leaving to dry or by drying) the foam or the material thus obtained, where appropriate (and preferably in said process), at least one step of hydrophobation (generally hydrophobation of the material obtained, but the hydrophobation may also/alternatively be performed at another moment, for example at the same time as the foaming operation).

This process makes it possible to obtain stable materials (silica foams) that have good strength and good heat-insulating properties, as explained and illustrated hereinbelow. An ionic interaction between the abovementioned zwitterionic surfactant and the silica (and stabilization of the particles and of the interfaces of the foam by said surfactant) is especially observed, enabling good forming of the foam and good stability of the particles and of the wet foam (with respect especially to draining, Ostwald maturation, coalescence, etc.), the stability of this wet foam being high since it makes it possible to conserve the porous structure during its drying and thus to obtain a cohesive/solid silica foam. This preferred process also makes it possible to control the size of the foam bubbles and the proportion of air incorporated, also enabling the production of silica foams that are lightened/of controlled density.

As defined according to the invention, the product developed comprises two porosities/two types of pore (which are significantly differentiated by their size (in the present case two distinct pore size distributions about two distinct peaks are observed), qualified in the present case by their diameter), the pores of one category (such as the submicron pores) being present between the pores of another category (such as the macropores). In general and advantageously, only two porosities/types of pore are present in the product, but it is not excluded for the product to be able to comprise more than two porosities/types of pore (especially about distinct distribution peaks). The diameter for qualifying the submicron pores is calculated, as explained hereinbelow, from the pore volume measurements by mercury intrusion porosimetry, using the Washburn equation, the diameter of the macropores being measured by scanning electron microscopy (SEM) or by X-ray tomography.

The product has, especially and advantageously, pores (and is formed from particles having pores) of submicron size with diameters of greater than 4 nm, generally greater than 5 nm, especially greater than 7 nm and in particular greater than 10 nm, and also less than 300 nm and in particular generally less than 200 nm or even 100 nm (the diameters varying within these limits according to the initial particles used, for example according to their specific surface area, the diameter distribution also possibly being more or less narrow or tight about a peak). As indicated previously, the macropores have diameters (i.e. have a diameter distribution) of between 10 microns and 3 mm, advantageously greater than 50 μm or even greater than 100 μm, and advantageously less than 500 μm, or even less than 300 μm.

Preferably, the pore volume for the submicron pores ranges from 1 to 3 $cm^3/g$ and in particular from 1 to 1.5 $cm^3/g$, and the pore volume for the macropores is greater than 1 $cm^3/g$ (i.e. 1 $cm^3$ per gram of material), preferably greater than 3 $cm^3/g$ and in particular ranges from 5 to 15 $cm^3/g$. The pore volume for the submicron pores ($V_{sm}$) is determined by mercury porosimetry formed on Pascal 140 and Pascal 440 reference machines sold by the company Thermo Scientific, and is considered as being equal to the cumulative volume of mercury introduced into the pores for mercury pressures greater than 1.47 MPa (pressure calculated by the Washburn equation—Washburn, 1921—for a pore diameter of 1 micron) and ranging especially up to 400 MPa with the abovementioned machines, the pores being assumed to be cylindrical, assuming the surface tension of mercury to be equal to 480 dynes/cm and the mineral particle/mercury contact angle equal to 140°, the pore volume being given in $cm^3$ per gram of material. The pore volume of macropores ($V_m$) is determined by the formula:

$$V_m = 1/\rho_a - 1/\rho_s - V_{sm}$$

$\rho_a$ being the apparent mass per unit volume of the product (corresponding to the ratio of its mass to its volume), $1/\rho_a$ being the specific volume of the material, $\rho_s$ being the mass per unit volume of the skeleton (part of the product occupied by the dense matter/without pores), which is (predominantly) mineral, measured by helium pycnometry (standard ASTM C604—"standard test method for true specific gravity of refractory materials by gas-comparison pycnometer", $\rho_s$ being, for example, of the order of 2000 kg/m³ for silica, the mass per unit volume thus being able to be divided by a factor of about 10 between the initial mass per unit volume of the particles and that of the finished material, this lightening resulting especially from the foaming and from the air introduced to this effect in a proportion of at least 65% by volume to obtain the product according to the invention), and $1/\rho_s$ being the specific volume of the skeleton.

The total pore volume ($V_p = V_m + V_{sm}$) of the heat-insulating material according to the invention is advantageously greater than 1.5 cm³/g and preferentially between 5.5 and 18 cm³/g.

The heat-insulating material according to the invention is in the form of a solid foam (generally rigid) of (or based on) porous silica particles and is obtained, as already mentioned, in particular from the mixture of at least the following elements: water (or optionally an aqueous foam) of the (abovementioned) silica particles of submicron porosity (generally as a dispersion/suspension (in water)), said particles having (initially, as introduced into the mixture) a specific surface area S of at least 5 m²/g (the specific surface area being given in m² per gram of particle(s)), in particular greater than 50 m²/g, and, where appropriate, a (at least one) surfactant and/or optionally an organic binder and/or a mineral binder and/or a pore-forming agent, and/or fibers (or reinforcements), etc., as explained hereinbelow.

Thus, more generally, the invention relates to a foam (which is solid) and inorganic (predominantly, as indicated hereinbelow) for heat insulation, this foam (forming the abovementioned product according to the invention) being formed from porous silica particles (this foam being termed a "silica foam"), and incorporating two different ranges of porosity, a first range of (macro)pores with diameters of between 10 microns and 3 millimeters, and a second range of submicron pores with diameters of greater than 4 nm and less than 300 nm and whose pore volume is at least 1 cm³/g, the mass per unit volume of the foam being less than 300 kg/m³.

The creation of this submicron porosity (or pore volume at the submicron scale) trapping air in a structure (a foam) that already has (macro)pores (this macroporosity originating from the foaming operation and corresponding to the air bubbles introduced, the size of the bubbles and the resulting substantially spherical macropores being relatively regular, with a more or less narrow or tight diameter distribution in particular between 50 µm and 500 µm, as already mentioned), and in the zones (or "walls") between said (macro)pores, improves the thermal performance qualities of the product, while at the same time giving a product that is comparatively lighter due to the presence of these additional pores, this additional porosity in the walls of the foam being provided especially by the intraparticulate porosity (initially present in the particles used and generally resulting from their synthesis), and also resulting from the stacking of these porous particles to constitute the walls of the foam. The foams thus obtained according to the invention have heat-insulating properties that are improved when compared with more standard inorganic foams of the same density, or when compared with common organic cellular insulators of polystyrene type, while at the same time being (more) economical and remaining light, and while having better aging resistance and fire resistance than organic products with equivalent heat-insulating performance qualities. Said materials/foams are compatible both for use as filling material and for surface use, especially on a façade.

The thermal performance qualities of the insulator according to the invention are reflected by heat conductivity values $\lambda$ (global) of less than 40 mW/m·K, especially between 20 and 40 mW/m·K (approximately), in particular less than 35 mW/m·K (approximately) and preferably less than 30 mW/m·K approximately (in particular for the insulator obtained via the preferred process according to the invention), descending especially to 25 mW/m·K, or even less (the thermal performance qualities being proportionately better the lower the heat conductivity). The heat conductivity $\lambda$ (in W/m·K) represents the amount of heat passing through the insulator (one meter thick, per m² and when the temperature difference between the two faces is 1° K). The heat conductivity values A (compared at identical pressure and temperature, in particular at atmospheric pressure (1 bar) and room temperature) are measured in the context of the invention with an HFM 436 series flowmeter from the company Netzsch™ according to the protocols established by standards ASTM C518 and ISO 8301. The characterization temperature is about 25° C., and the measurements are taken at atmospheric pressure, the precision of the measurements being estimated at 5%.

For comparative purposes, the gain in efficiency of heat conductivity may be at least 20% or 25%, or even (with the process according to the invention) at least 30% (less heat conductivity) relative to a similar solid foam (mineral and of the same density) but obtained without the porous particles and not having the double porosity (but only the macropores), for example relative to a glass foam obtained (especially) from glass that is melted and then introduced into a foaming oven, as illustrated hereinbelow in the comparative examples.

The product according to the invention is also much easier to obtain than aerogels (which, on account of their hydrophobic nature, do not make it possible especially to truly obtain a foam and do not generate double porosity as defined according to the invention), obtained starting with precursors/starting materials and by performing a chemical reaction to form the mineral substance forming them (whereas, in the case of the product according to the invention, the mineral substance employed—the mineral particles (thus other than aerogels)—is already formed and simply put into form without making use of treatments for degrading them (grinding, etc.) or for modifying their chemical composition, as is seen in the process according to the invention). The porous structure of the product according to the invention and/or said product is thus advantageously formed without chemical reaction or alteration as mentioned previously. The same observation may be made by comparison of meso- or nanoporous structures or foams existing in other fields or applications (for example used for molecular sieves and obtained, for example, via a sol-gel route from precursors) which, having different specificities and constraints, usually result from chemical reactions or from mechanical degradation operations. The product according to the invention is obtained via a simpler process that is more economical to implement.

The apparent mass per unit volume of the material (or product or foam) according to the invention is less than 300 kg/m³, this mass per unit volume possibly varying according to the formulation (additives, pH, etc.) and the foaming conditions (foaming time, stirring speed, geometry of the tank and paddle, etc.). The mass per unit volume is determined by establishing the ratio of the mass of a given volume of the material to said volume. Preferably, the mass per unit volume of the insulating material according to the invention is less than or equal to 200 kg/m³, in particular less than 130 kg/m³, advantageously less than 120 kg/m³, or even less than 100 kg/m³, and even less than 80 kg/m³.

The material according to the invention is predominantly (to at least 80% by weight or even 90%), or even solely, mineral/inorganic (the organic materials that may be present possibly being, where appropriate, an organic binder, an organic graft, etc.), which makes it possible especially to ensure good fire resistance. The material is also essentially (to at least 80% by weight, or even 90%) formed from the abovementioned silica particles in a foam structure. These silica particles are solid and porous, and are used directly to form the product without modification of their formula.

The silica particles are generally (initially) in the form of a powder, whose particle size advantageously ranges from 1 µm to 500 µm (especially between 3 and 300 µm) of median diameter D50, this diameter being measured by particle size analysis by laser scattering according to standard ISO 13320-1:2000 especially, the powder being, where appropriate, in dispersion, especially in water (oil especially also possibly being added, for example for a surfactant and consolidating effect, and/or a binder especially), and used (or incorporated) in the form of said dispersion to form the product according to the invention. Preferably, the particle size (D50) is less than 100 µm, in particular less than 10 µm.

The initial specific surface area S of these silica particles is advantageously greater than 30 m²/g, generally greater than 50 m²/g and especially greater than 100 m²/g, this specific surface area ranging in particular up to 500 m²/g and especially being advantageously between 100 and 500 m²/g, or even, where appropriate, between 100 and 300 m²/g (these particles generally and advantageously being hydrophilic in order to be dispersed in water without addition of a component or surfactant for this purpose; this is because the specific surface area advantageously does not exceed the abovementioned maximum values in order to avoid degradation of the thermal performance qualities due to said hydrophilic nature).

The specific surface areas, expressed in m²/g, are measured by adsorption of nitrogen (theory of multiple adsorption of gases by means of Brunauer, Emmett and Teller determinations—BET method) in accordance with standard ISO 9277:2010.

Preferably, the mineral substance forming the silica particles is an amorphous silica, such as a precipitated silica, a pyrogenic silica, a fumed silica or a silica gel. A precipitated silica and/or pyrogenic silica is preferred in particular (such as the pyrogenic silica sold by the company Wacker™ under the reference HDK® T30). Particularly preferably, it is a precipitated silica, for example the precipitated silica sold under the reference Tixosil® 365 by the company Rhodia™ with a specific surface area (measured by BET in accordance with standard ISO 9277:2010) of 160 m²/g. The submicron pores in the product according to the invention formed from these particles in particular have a diameter of between 4 nm and 200 nm (i.e. each pore of this category has a diameter that is within this range, the distribution of all the diameters of these pores being more or less narrow or tight), in particular less than 100 nm.

It is also possible, where appropriate, to combine several types of silica (for example to use in combination pyrogenic silica particles and precipitated silica particles to form the product according to the invention).

Besides the mineral particles, the material according to the invention is formed from water or an aqueous phase (the presence of another medium also, for example oil and/or an alcohol, especially glycerol, not being excluded), in which medium are found or are incorporated the mineral particles, and which is foamed (method known as "direct foaming" according to the invention). Another method would consist in using an already-formed aqueous foam (or liquid of soapy appearance, obtained by disordered stacking of gas bubbles in an aqueous phase), into which are added the particles (especially in the form of a dispersion, which is generally aqueous) (method known as "incorporation"), but direct foaming is preferred for the manufacture of the silica foams according to the invention. The as yet non-foamed starting aqueous phase in which are present the particles before foaming also advantageously comprises at least one surfactant compound as indicated previously.

Surfactants enabling good foaming are especially (salts of) anionic surfactants (cationic or nonionic agents posing, for their part, problems for foaming), in particular selected from the compounds of general formula: $R-X^-, Y^+$, for which R is an aliphatic chain of 10 to 24 carbon atoms, $X^-$ is a group bearing a negative charge (carboxylate, sulfate, sulfonate, etc. group), and $Y^+$ is a counter-cation selected from ammonium, sodium and potassium groups, for example carboxylate salts comprising 12 to 24 carbon atoms, selected especially from myristate, palmitate, stearate and oleate salts, or the conjugated base of behenic acid, or carboxylates derived from the treatment of tallow fatty acids, or alternatively other conjugate bases of fatty acids, for instance soaps/shower gels comprising fatty acids derived from natural sources such as tallow, coconut oil, etc., for example surfactants such as ammonium stearate, etc.

However, since the anionic surfactants are not absorbed at the surface of the silica to contribute towards stabilization of the foam, use is preferably made of at least one zwitterion as already mentioned as surfactant. Among the zwitterions, mention may be made especially of amino acids or derivatives, etc. According to the invention, they are advantageously preferably betaines such as phosphorus betaines and/or ammonium betaines, and particularly preferably it is cocamidopropylbetaine (CAPB). It appears that CAPB is adsorbed especially at the surface of the silica while at the same time ensuring a certain electrostatic repulsion between the particles, thus avoiding their agglomeration, this interaction giving the particles very good foaming properties and making it possible to obtain low densities with relatively fine bubble sizes, the silica foam obtained then being sufficiently stable (from the point of view of draining and coalescence) in particular up to and during its drying.

Where appropriate, use may be made, besides at least one zwitterion, of at least a second surfactant (also introduced into the mixture) or cosurfactant, the zwitterion then acting mainly on the stability of the bubbles (for the time that the product dries), and the cosurfactant possibly participating, for example, in another aspect such as the prevention of Ostwald maturation.

Generally, the mixture (for the production of the insulating material, or the mixture of particles) comprises less than 5% and advantageously less than 2% of surfactant(s), including at least one zwitterion chosen from betaines (in particular ammonium betaines and preferentially CAPB). In particular, the mixture comprises at least one zwitterion in a content of less than 2%, in particular of about 1%, and less than 1% of other cosurfactant(s).

It is also possible, in combination especially with the use of a surfactant, to use at least one pore-forming agent in the mixture. The term "pore-forming agent" used in the present invention denotes any substance that is capable of generating porosity in a material by means of a treatment subsequent to the insertion of this agent into the material to remove said agent at least partially. The addition of pore-forming agents allows, where appropriate, an additional increase in the pore volume. The mineral aggregates become structured around the pore-forming agents, elimination of said agents resulting in the formation of porosity in a controlled manner.

The weight ratio of the mineral substance relative to the pore-forming agent is, for example, from 0.2 to 3 and especially from 0.7 to 2.5. At least 10% (by weight), especially at least 30%, in particular at least 50% and preferably at least 90%, of the pore-forming agent is eliminated, for example by calcination or washing, during the manufacture of the insulating product (in particular after formation of the rigid foam).

Advantageously, the pore-forming agent is formed from a material whose calcination temperature is below the melting point and/or sintering point of the silica in which it is enclosed. In the case of precipitated silicas, the calcination temperature of the pore-forming agent should be, for example, less than 700° C.

The pore-forming agent is, for example, based on/in the form of particles, which are generally spherical, of at least one organic material, for example a polymer, especially in colloidal form. It may be, for example, at least one organic particle, consisting of (co)polymers containing amphiphilic or stereoregular blocks comprising blocks AB or ABA (A representing a hydrophilic block such as polyethylene oxide or polyacrylic acid and B a hydrophobic block such as polystyrene, polypropylene oxide, polyisoprene or polyvinylpyridine). They may also be starch particles and/or inorganic salts, such as NaCl (incorporated into the aqueous mixture containing, where appropriate, a cosolvent, such as ethanol, the inorganic salts being removed thereafter by washing). Preferably, the agent under consideration is latex particle(s) and/or a colloidal dispersion of polymer(s) and/or of particle(s) consisting of macromolecule(s), chosen from those rather giving spheres. The latex may especially comprise: a (co)polymer of vinyl type, advantageously of acrylic and/or carboxylic acid derivative type, a copolymer of vinyl chloride and of olefin, optionally silanized, etc. It may be a commercial latex such as the polyurethane Baybond XP 2602 sold by the company Bayer, a latex in the form of an oxidized or non-oxidized polyethylene wax, optionally with an acrylic copolymer (such as those sold by Rohm & Haas and from the company Dow Chemical), a styrene-acrylic copolymer or any acrylic obtained by emulsion or dispersion radical polymerization (those sold by the company BASF in the Acronal® range), etc. Preferably, it is at least one water-dispersible acrylic copolymer (such as those sold under the reference Neocryl® by the company DSM, such as Neocryl® XK-52, Neocryl® BT 21 or Neocryl® BT 100). The latex (latices) used as pore-forming agent(s) advantageously have a glass transition temperature Tg of greater than 50° C., especially between 50 and 200° C. and in particular between 70 and 170° C.

The pore-forming agents may be used in emulsion or dispersion, their mass content being, for example, between 5% and 75%, especially between 20% and 60% or even between 30% and 50% of the total weight of the emulsion or dispersion.

The mixture (for obtaining the insulating material or the mixture of particles) may also comprise at least one organic and/or mineral binder, used, for example, for bonding the particles together and/or for bonding the particles to the rest of the structure of the material.

The binder may advantageously be a latex (chosen especially, this time, from those with a tendency to form films, this binder especially making it possible to reinforce the foam), in particular an emulsion or aqueous dispersion of one or more natural or synthetic polymer substances, which are generally thermoplastic. This latex binder preferentially has a glass transition temperature Tg of less than 50° C., in particular between −50° C. and 25° C., preferably between −20° C. and 10° C., advantageously between −10° C. and 0° C., and preferentially has a film-forming temperature lower than room temperature, in order to obtain the desired strength for the insulating materials to be applied to a support in the field of building construction especially. The latex may contain a (co)polymer of vinyl type (for example based on vinyl acetate, in particular a polyvinyl acetate homopolymer, or based on a copolymer of vinyl acetate and of (meth)acrylic or maleic acid and/or ester, olefin and/or vinyl chloride, or based on a vinyl chloride/ethylene copolymer), or of acrylic type (especially an acrylonitrile/acrylic ester copolymer, or styrene/silanized acrylic acid or ester copolymer and/or carboxylic acid derivative copolymer). The latex may especially be a styrene-acrylic copolymer or any acrylic. These latices are, for example, those sold by the company BASF in the range referenced under the name Acronal®, in particular Acronal® S 400.

Other additives may also be added (generally to the mixture of particles or the mixture used to obtain the foam/the product according to the invention or to the foam), such as rheological agents (plasticizer, such as glycerol, etc.), surface agents, water-retaining agents (such as gelatin or glycerol, etc.), opacifiers (for example aluminum or graphite as infrared opacifier), mineral fillers, or other materials for reinforcing the mechanical strength (glass or organic fibers, silicate, gypsum, cement, organic binders of latex type as explained previously, etc.), or limiting the shrinkage of the foam (glass microsphere, etc.) or the disproportion of the bubbles and reducing their size (the foaming being performed, for example, under a perfluorohexane atmosphere), etc.

In particular, to prevent maturation, cosurfactants of cationic surfactant type or cationic polymers, or saponins, or nonionic polymers of cellulose ether type (such as hydroxypropylmethylcellulose) may advantageously be added, these various agents also possibly having an important role during the drying of the foams such as reduction of the shrinkage and/or fracturing (cellulose ethers, such as hydroxypropylmethylcellulose, in particular significantly reducing the fracturing).

In particular, the heat-insulating material according to the invention may be prepared from at least the following elements, in the amounts expressed as weight percentages relative to the total mass of the mixture: from 40% to 95% water, from 5% to 60% silica and from 0 to 15% additive(s) (binder, opacifier, hydrophobizing agent, surfactant, pore-forming agent, etc.).

The present invention thus makes possible the manufacture of a wide variety of highly insulating materials based on silicas and, where appropriate, various additives, to cover a wide range of insulating applications, especially in the building sector.

The additives (in particular the surfactant(s)) are generally introduced into the mixture of particles before the introduction of the gas for the foaming operation (in the second case of incorporating particles into an already-formed aqueous foam, this foam may also be prepared using a solution or dispersion comprising said additives (including the surfactant(s)) before the introduction of the gas for the foaming operation).

In the process according to the invention, the pH of the mixture may moreover be adjusted (adjusted to about 8.5 in the case of CAPB, since CAPB at an excessively acidic pH loses some of its charges) advantageously, in particular before foaming.

The step of putting in form generally comprises operations of casting or molding of the foam comprising the particles in cavities of appropriate shape or cross section or of spraying of the foam onto a surface or wall. The term "molding" should be taken in the broad sense and covers any form of conformation, such as casting in an open mold, extrusion through a die and chopping of the extrudate, etc., the drying generally being consecutive to the putting in form.

The process according to the invention may also include, where appropriate, after drying, at least one heat treatment step for consolidating the material and/or removing, where appropriate, the pore-forming agent.

The process advantageously comprises a step of hydrophobation of the material obtained (i.e. the material is made hydrophobic), this hydrophobation, in the present case, contributing towards reducing the heat conductivity of the foam (for example up to about 25% relative to the product that has not undergone the step).

The heat-insulating material obtained is solid (and generally rigid) and multi- (in particular bi-) porous. It is generally (designed) in the form of a panel whose thickness is at least equal to 5 mm. It may also be obtained in the form of at least one layer (applied for example, to a plasterboard), or the material while still wet may be impregnated or spread onto a web (for example a nonwoven, etc.), or the material may be combined with a fiber matrix or another layer, etc.

The present invention also relates to the use of the insulating material/of the foam according to the invention in the construction sector, especially for insulating the walls of buildings.

The present invention and the advantages thereof will be understood more clearly on reading the examples described below, which are given as nonlimiting illustrations.

EXAMPLE 1

In this example, a silica foam was manufactured as follows:

Precipitated silica sold by the company Rhodia under the reference Tixosil T365 (with a median diameter D50 of about 3.5 microns and a specific surface area of about 130 m$^2$/g) was dispersed in water, and an ammonium polyacrylate anionic surfactant sold by the company Zschimmer & Schwartz under the reference Schaümungsmittel W53FL, water-retaining agents (in the present example: gelatin and glycerol, the glycerol also acting as plasticizer) and a mineral binder (in this case sodium silicate) were then added to this dispersion, followed by mechanical stirring using a blender such that the volume of the wet foam thus obtained was equal to about 3 times the initial volume of the non-foamed dispersion.

The composition of the mixture was as follows (expressed as weight percentages): water: 73.4%; precipitated silica: 18.2%; sodium silicate: 2.7%; gelatin: 3.2%; glycerol: 0.5%; surfactant: 1.9%.

The wet silica foam was then cast in a Teflon mold and placed in an oven at a temperature below 25° C. and at 80% relative humidity for 3 days. Once dried, the foam or paste, which had undergone a loss of mass of about 80%, was hardened, in the form of a solid. The monolith was then placed in a closed chamber containing hexamethyldisilazane (HMDS) as hydrophobic agent (this compound being sold under the reference 52619 of the Fluka brand by the company Sigma-Aldrich) for 4 hours at 80° C.

The product obtained, having the two ranges of porosities according to the invention (in particular macropores with diameters of between 10 μm and 3 mm, and submicron pores with diameters of greater than 4 nm and less than 300 nm) and containing more than 65% by volume of air was then characterized according to the methods mentioned in the text hereinabove, the values obtained being as follows:

mass per unit volume: 200 kg/m$^3$;
pore volume of the macropores with diameters of between 10 microns and 3 mm: at least 3.3 cm$^3$/g;
pore volume of the submicron pores with diameters of between 4 nm and 300 nm: 1.25 cm$^3$/g;
heat conductivity: 36 mW/m·K.

The accuracy of the measurements was estimated as 5%.

The values indicated show that the heat-insulating inorganic material obtained had a low mass per unit volume at the same time as a high porosity with two types of porosity, including pores with a diameter of between 4 nm and 300 nm, and had advantageous thermal performance qualities.

EXAMPLE 2

Precipitated silica (the product sold by the company Rhodia under the reference Tixosil T365 as in Example 1) was predispersed in water, at 25% by weight in the water, by sonication (using an ultrasonic probe or bath). The pH was adjusted to 8.5 by addition of sodium hydroxide, and water was then added to reach a final silica concentration of 22% and the dispersion was again homogenized by sonication.

Cellulose ether (sold under the reference Methocel 311 by the company Dow Chemical Company), which can reduce the cracking of the silica foam on drying, was then added to a final concentration of 0.25%. The dispersion was again homogenized by sonication for a few minutes, the mixture obtained being homogeneous.

The zwitterionic surfactant CAPB (sold by the company Goldschmidt) was then added at a concentration of 0.3 mg per m$^2$ of silica specific surface area, i.e. 0.045 g per gram of silica. The mixture, which became more viscous, was again homogenized by ultrasonication, and foaming of the silica dispersion was then performed using an Elekom EK719 brand rotary mixer-blender.

The wet foam was then divided among Teflon evaporation crucibles, and then dried in an air-conditioned chamber at 35° C. and 80% relative humidity. The silica foams were then rendered hydrophobic by reaction with hexamethyldisilazane (HMDS) in the vapor phase (the sample being placed in a closed chamber containing liquid HMDS, which evaporates off and becomes adsorbed onto the surface of the material) in Teflon reactors for 4 hours at 80° C. Once the treatment was complete, the reactors were cooled to room temperature before opening, the solid foam samples obtained were then machined especially so that their faces were flat and parallel, the samples also being stabilized in an ambient atmosphere over a weekend.

The product obtained according to the invention, having the two ranges of porosities according to the invention (in particular macropores with diameters of between 10 μm and 3 mm, and submicron pores with diameters of greater than 4 nm and less than 300 nm) and containing more than 65% by volume of air, was then characterized, before and after hydrophobation, according to the methods mentioned earlier in the text, values obtained being as follows:
- mass per unit volume: 130 kg/m³;
- specific surface area: 150 m²/g;
- pore volume of the macropores with diameters of between 10 microns and 3 mm: at least 6 cm³/g;
- pore volume of the submicron pores with diameters of between 4 nm and 300 nm: 1.3 cm³/g;
- heat conductivity before hydrophobation: 35 mW/m·K;
- heat conductivity after hydrophobation: 29 mW/m·K.

It is observed that the material obtained by means of the preferred process according to the invention, in particular based on the use of cocamidopropyl as surfactant, has a heat conductivity that is further improved relative to the material obtained by means of a general process based especially on an anionic surfactant such as ammonium stearate. In addition, the hydrophobation further reduces the heat conductivity of the foam.

The stability of the silica foam obtained with the surfactant CAPB was also compared with that of other silica foams obtained with other surfactants (and also their capacity to produce a silica foam).

To do this, each suspension was prepared by dispersing the precipitated silica (sold under the reference Tixosil T365 by the company Rhodia) in distilled water. The pH was adjusted to 8.5 by means of a sodium hydroxide solution (2 M) and the suspension was then agitated in an ultrasonic bath for 5 hours. The surfactant was then added to the suspension, the silica concentration in the suspension being 15.9% by weight and the surfactant concentration 0.5%.

5.5 g of suspension were placed in a 30 ml cylindrical glass container and the volume Vs of the suspension was measured. Next, the suspension was stirred using a rotary mixer for one minute. The volume Vm of the foam formed was measured (Vm=Vs if no foam is formed), the volume fraction of air initially incorporated into the foam being defined as the ratio F0=(Vm−Vs)/Vm, this volume fraction making it possible to assess the foamability (ability to form a foam) of the suspension. The container was then left for one hour at room temperature and pressure, and volume of the foam was again measured, and the volume fraction of air still present (F1) was evaluated, the estimated precision on the measurements of F0 and F1 being 5%.

With the zwitterionic surfactant CAPB of the present example, values of F0 and F1 obtained were each 60%.

With a cationic surfactant such as cetyltrimethylammonium chloride (CTAC) sold by the company Sigma, it was not possible to obtain a silica foam (F0=F1=0%) and similarly with a zwitterionic surfactant of cocamidopropyl hydroxysultaine (CHS) type (other than a betaine) sold by the company Rhodia.

With an anionic surfactant such as sodium lauryl ether sulfate (SLES) sold by the company Stepan, a silica foam was easily obtained (F0=60%), but it could not be conserved sufficiently over time (F1=0%).

The use of the surfactant CAPB is thus particularly advantageous relative to other surfactants by especially making it possible to obtain a foam that is stable enough over time to enable its drying and its solidification.

COMPARATIVE EXAMPLE

In this example, the characteristics of a glass foam sold under the reference FoamGlas S3 by the company Foamglas Building were measured. This foam is purely mineral and has masses per unit volume of the same order as those of the products according to the invention. However, unlike the products according to the invention, it only has one porosity range (macropores with diameters greater than 10 μm). The values obtained were as follows:
- mass per unit volume: 130 kg/m³;
- pore volume of the macropores with diameters greater than 10 microns: 7.2 cm³/g;
- heat conductivity: 45 mW/m·K.

The accuracy of the measurements was estimated as 5%.

It was observed that for an equivalent mass per unit volume, the heat-insulating properties of the product according to the invention are much better than those of a "monoporous" foam such as in the present example (see for comparative purposes Example 2 according to the invention).

The products according to the invention are particularly suitable for heat insulation, in particular in the construction sector for insulating the walls (exterior or interior) of buildings. The products according to the invention also have properties or may be used advantageously in acoustic insulation, and applications in the lightening of materials.

The invention claimed is:

1. A heat-insulating material, formed from silica particles of submicron porosity,
   wherein the heat-insulating material is a solid silica foam incorporating two different ranges of porosities, including:
   a first range of macropores with diameters of between 10 microns and 3 mm; and
   a second range of submicron pores with diameters greater than 4 nm and less than 300 nm,
   wherein the pore volume for the submicron pores ranges from 1 to 1.5 cm³/g, and the pore volume for the macropores is from 3 to 15 cm³/g,
   wherein the heat-insulating material has a mass per unit volume of the heat-insulating material is less than 300 kg/m³, and
   wherein the silica particles of submicron porosity do not comprise aerogels, the silica particles of submicron porosity have submicron pores with diameters of greater than 4 nm, and the silica particles of submicron porosity have a specific surface area less than or equal to 500 m²/g.

2. The heat-insulating material of claim 1, wherein the heat-insulating material is obtained from a mixture comprising:
   water or an aqueous foam,
   silica particles of submicron porosity, incorporated into the aqueous foam or the water in the form of a dispersion/suspension, the silica particles having a specific surface area S of greater than 5 m²/g, and,
   optionally an organic binder and/or a mineral binder, and/or a surfactant and/or a pore-forming agent and/or a reinforcement.

3. The heat-insulating material of claim 1, wherein the silica particles are based on an amorphous silica.

4. The heat-insulating material of claim 1, wherein the heat-insulating material has a heat conductivity of less than 40 mW/m·K.

5. A heat insulation for buildings, comprising the heat-insulating material of claim 1.

6. The heat-insulating material of claim 2, wherein the silica particles having a specific surface area S is greater than 50 m²/g.

7. The heat-insulating material of claim 3, wherein the amorphous particles are precipitate silica, pyrogenic silica, fumed silica or a silica gel.

8. The heat-insulating material of claim 1, wherein the pore volume for the macropores is in a range of from 5 to 15 cm$^3$/g.

9. The heat-insulating material of claim 4, wherein the heat-insulating material has a heat conductivity of less than 25 mW/m·K.

10. The heat-insulating material of claim 1, wherein the silica particles of submicron porosity have a specific surface area greater than 5 m$^2$/g.

11. The heat-insulating material of claim 1, wherein the silica particles of submicron porosity have a specific surface area greater than 30 m$^2$/g.

12. The heat-insulating material of claim 1, wherein the silica particles of submicron porosity have submicron pores with diameters of greater than 7 nm.

\* \* \* \* \*